United States Patent
Kakizaki et al.

(10) Patent No.: US 6,975,811 B1
(45) Date of Patent: Dec. 13, 2005

(54) OPTICAL ONE-TO-ONE PROTECTION SWITCHING APPARATUS

(75) Inventors: Sunao Kakizaki, Kawasaki (JP); Hideaki Tsushima, Komae (JP); Takashi Mori, Yokohama (JP); Masahiro Takatori, Yokohama (JP); Yukio Hayashi, Fujisawa (JP); Shinichi Kuwano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 09/650,506

(22) Filed: Aug. 29, 2000

(30) Foreign Application Priority Data

May 29, 2000 (JP) .................................... P2000-158554

(51) Int. Cl.[7] .............................................. H04B 10/00
(52) U.S. Cl. ............................................. 398/2; 398/5
(58) Field of Search ........................... 398/1, 2, 5, 145; 385/16

(56) References Cited

U.S. PATENT DOCUMENTS

| | | | | | |
|---|---|---|---|---|---|
| 5,903,370 | A | * | 5/1999 | Johnson | 398/4 |
| 5,978,354 | A | * | 11/1999 | Taketomi et al. | 370/226 |
| 6,414,765 | B1 | * | 7/2002 | Li et al. | 398/5 |
| 6,434,288 | B1 | * | 8/2002 | Uemura et al. | 385/16 |

OTHER PUBLICATIONS

ITU–T G.841, "Types and Characteristics of SDH Network Protection Architectures", Oct. 1998, pp. 11 and 17.*
Rajiv Ramaswami and Kumar N. Sivarajan, "Optical Networks: A Practical Perspective", Morgan Kaufman Publishers pp. 430–434.

* cited by examiner

Primary Examiner—Jason Chan
Assistant Examiner—Shi K. Li
(74) Attorney, Agent, or Firm—Knoble Yoshida & Dunleavy

(57) ABSTRACT

An optical one-to-one protection switching apparatus exchanges signals between a transmit node and a receive node. If a fault is detected in the first transmission line (down-stream), a controller in the node controls a drive circuit so as to shut off a gate. Then, the controller in the transmit node upon receiving a switching request from the receive node, controls the drive circuit so as to shut off the gate. Thereby, the optical switch is switched. The transmitter of the client terminal is thus connected to the second transmission line (down-stream). Upon receiving the switching request from the transmit node, the optical switch in the receive node is switched. Thereby the receiver in the client terminal is connected to the second transmission line (down-stream).

21 Claims, 13 Drawing Sheets

FIG. 4

| | PRIORITY | TRANSMISSION LINE | CONTROL SIGNAL COMMUNICATION EQUIPMENT | |
|---|---|---|---|---|
| | | | NODE1 | NODE2 |
| SWITCHING REQUEST TO TRANSMIT NODE (NODE1) FROM RECEIVE NODE (NODE2) (282) | FIRST | 2ND TRANSMISSION LINE (UP-STREAM)195 | LINE OUTPUT DEVICE 370 | LINE INPUT DEVICE 365 |
| | SECOND | 1ST TRANSMISSION LINE(UP-STREAM)185 | LINE OUTPUT DEVICE 350 | LINE INPUT DEVICE 345 |
| SWITCHING REQUEST TO RECEIVE NODE (NODE2) FROM TRANSMIT NODE (NODE1) (292) | FIRST | 2ND TRANSMISSION LINE (DOWN-STREAM)190 | LINE INPUT DEVICE 340 | LINE OUTPUT DEVICE 375 |
| | SECOND | 1ST TRANSMISSION LINE (DOWN-STREAM)180 | LINE INPUT DEVICE 360 | LINE OUTPUT DEVICE 355 |

FIG. 5

| | | 1ST TRANSMISSION LINE(DOWN-STREAM) 180 | 1ST TRANSMISSION LINE(UP-STREAM) 185 | 2ND TRANSMISSION LINE(DOWN-STREAM) 190 | 2ND TRANSMISSION LINE(UP-STREAM) 195 |
|---|---|---|---|---|---|
| NORMAL STATE | TRANSMITTER | LINE INPUT DEVICE 340 | LINE INPUT DEVICE 345 | LINE INPUT DEVICE 360 | LINE INPUT DEVICE 365 |
| | PERFORMANCE MONITOR | LINE OUTPUT DEVICE 355 | LINE OUTPUT DEVICE 350 | LINE OUTPUT DEVICE 375 | LINE OUTPUT DEVICE 370 |
| AFTER SWITCHING | TRANSMITTER | LINE INPUT DEVICE 360 | LINE INPUT DEVICE 365 | LINE INPUT DEVICE 340 | LINE INPUT DEVICE 345 |
| | PERFORMANCE MONITOR | LINE OUTPUT DEVICE 375 | LINE OUTPUT DEVICE 370 | LINE OUTPUT DEVICE 355 | LINE OUTPUT DEVICE 350 |

FIG. 7

| | PRIORITY | TRANSMISSION NODE | CONTROL SIGNAL COMMUNICATION EQUIPMENT | |
|---|---|---|---|---|
| | | | NODE1 | NODE2 |
| SWITCHING REQUEST TO TRANSMIT NODE (NODE1) FROM RECEIVE NODE (NODE2) (282) | FIRST | 2ND TRANSMISSION LINE (UP-STREAM) 195 | LINE OUTPUT DEVICE 370 | LINE INPUT DEVICE 365 |
| | SECOND | 1ST TRANSMISSION LINE (UP-STREAM) 185 | LINE OUTPUT DEVICE 350 | LINE INPUT DEVICE 345 |
| SWITCHING REQUEST TO RECEIVE NODE (NODE2) FROM TRANSMIT NODE (NODE1) (292) | FIRST | 2ND TRANSMISSION LINE (DOWN-STREAM) 190 | LINE INPUT DEVICE 340 | LINE OUTPUT DEVICE 375 |
| | SECOND | 1ST TRANSMISSION LINE (DOWN-STREAM) 180 | LINE INPUT DEVICE 340 | LINE OUTPUT DEVICE 355 |

FIG. 8

| | 1ST TRANSMISSION LINE(DOWN-STREAM) 180 | 1ST TRANSMISSION LINE(UP-STREAM) 185 | 2ND TRANSMISSION LINE(DOWN-STREAM) 190 | 2ND TRANSMISSION LINE(UP-STREAM) 195 |
|---|---|---|---|---|
| NORMAL STATE / TRANSMITTER | LINE INPUT DEVICE 340 | LINE INPUT DEVICE 345 | LINE INPUT DEVICE 360 | LINE INPUT DEVICE 365 |
| NORMAL STATE / PERFORMANCE MONITOR | LINE OUTPUT DEVICE 355 | LINE OUTPUT DEVICE 350 | LINE OUTPUT DEVICE 375 | LINE OUTPUT DEVICE 370 |
| AFTER SWITCHING / TRANSMITTER | LINE INPUT DEVICE 340 | LINE INPUT DEVICE 345 | LINE INPUT DEVICE 340 | LINE INPUT DEVICE 345 |
| AFTER SWITCHING / PERFORMANCE MONITOR | NONE | NONE | LINE OUTPUT DEVICE 355 | LINE OUTPUT DEVICE 350 |

FIG. 10

| | 1ST TRANSMISSION LINE(DOWN-STREAM) 180 | 1ST TRANSMISSION LINE(UP-STREAM) 185 | 2ND TRANSMISSION LINE(DOWN-STREAM) 190 | 2ND TRANSMISSION LINE(UP-STREAM) 195 |
|---|---|---|---|---|
| NORMAL STATE — TRANSMITTER | LINE INPUT DEVICE 340 | LINE INPUT DEVICE 345 | LINE INPUT DEVICE 360 | LINE INPUT DEVICE 365 |
| NORMAL STATE — PERFORMANCE MONITOR | LINE OUTPUT DEVICE 355 | LINE OUTPUT DEVICE 350 | LINE OUTPUT DEVICE 375 | LINE OUTPUT DEVICE 370 |
| AFTER SWITCHING — TRANSMITTER | LINE INPUT DEVICE 340 | LINE INPUT DEVICE 345 | LINE INPUT DEVICE 340 | LINE INPUT DEVICE 345 |
| AFTER SWITCHING — PERFORMANCE MONITOR | LINE OUTPUT DEVICE 375 | LINE OUTPUT DEVICE 370 | LINE OUTPUT DEVICE 355 | LINE OUTPUT DEVICE 350 |

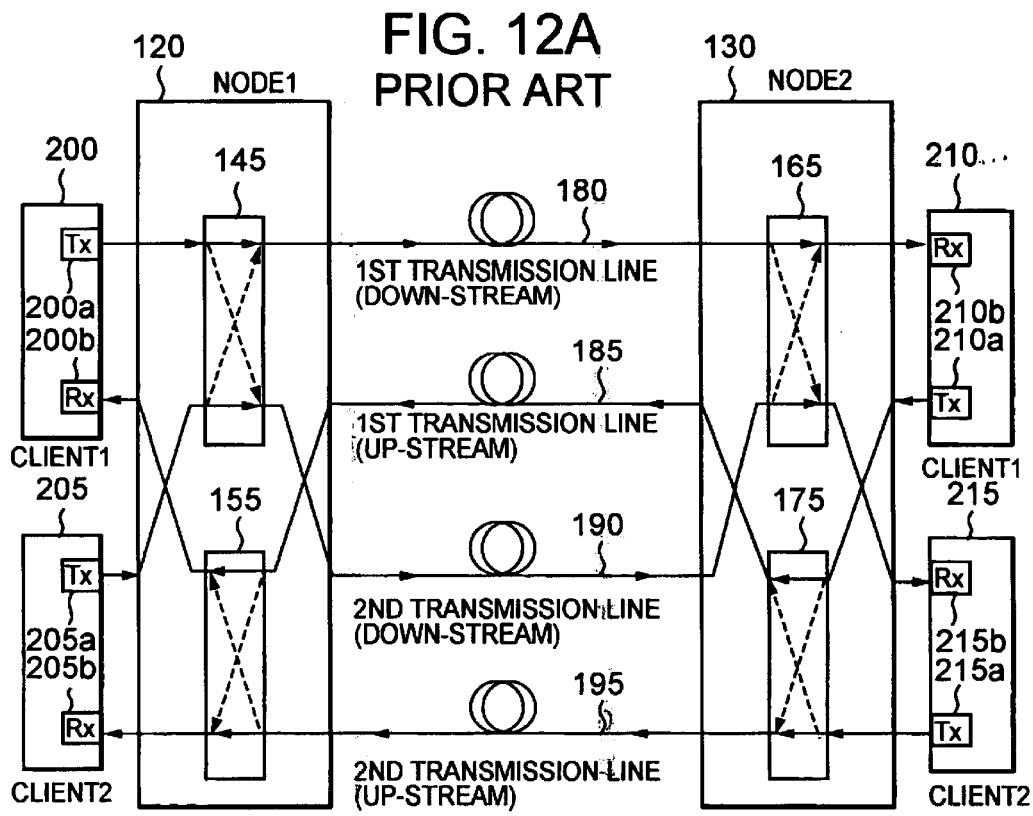
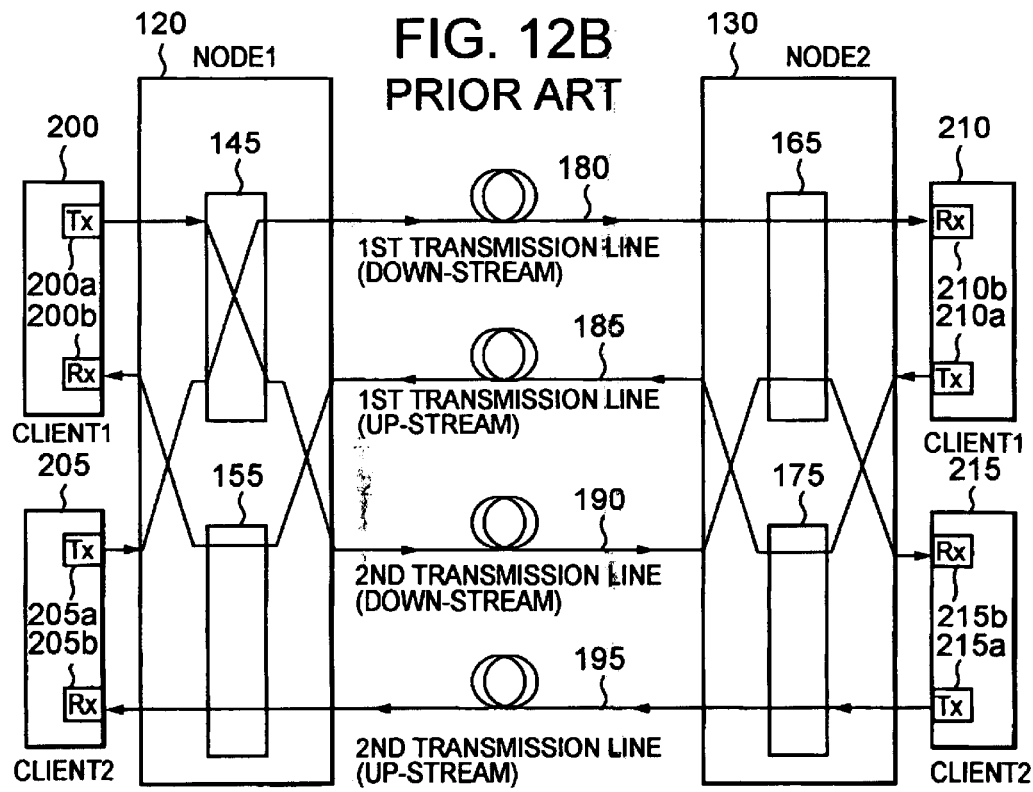

FIG. 13 PRIOR ART

| TRANSMITTER | RECEIVER | | |
|---|---|---|---|
| | NORMAL | AFTER SWITCHING OF TRANMITTING NODE | AFTER SWITCHING OF BOTH NODES |
| 200a CLIENT1 | 210b | 215b (MIS CONNECTION) | 210b |
| 205a CLIENT2 | 215b | 210b (MIS CONNECTION) | 215b |

OPTICAL ONE-TO-ONE PROTECTION SWITCHING APPARATUS

RELATED APPLICATIONS

JP application numbers 2000-157922(May 29, 2000) and 2000-155267(May 25, 2000) are related to the present invention and they are to be applied for patents in the United States of America, hereby incorporated by reference.

BACKGROUND OF THE INVENTION

The present invention relates to an optical one-to-one protection switching apparatus, more particularly to an optical one-to-one protection switching apparatus employed to prevent miss-connection that might occur between a transmitter and a receiver while a working line and a protection line are switched.

Optical Networks (Ramaswami et al. Morgan Kaufman publishers pp430–434) is a known example in this field.

FIG. 12A shows a block diagram of an optical one-to-one protection switching apparatus in the related art. In the case of this related art, extra traffic can be included. According to this optical one-to-one protection switching apparatus, client terminals 200 and 210 at different points communicate with each other through first transmission lines 180 and 185. At this time, the optical switches 145 and 165 select the first transmission line 180 for down-stream communications. For up-stream communications, the optical switches 175 and 155 select the first transmission line 185. The client terminals 205 and 215 communicate with each other through the second transmission lines 190 and 195. At this time, the optical switches 145 and 165 select the second transmission line 190 for down-stream communications and the optical switches 175 and 155 select the second transmission line 195 for up-stream communications. The arrows in each optical switch denote a transmission direction of signals. Solid lines arrow denote "the normal state", and broken lines denote "a state after switching". The same notations are used in the subsequent embodiments.

Referring to FIG. 12B, if a fault is detected in the first transmission line 180 or 185 in down-stream or up-stream communications, the optical switches are changed between 145 and 155, as well as between 165 and 175. Thereby, the client terminals 200 and 210 communicate with each other through the second transmission lines 190 and 195. The client terminal 205 or 215 that transmits low priority extra traffics communicates with each other through the first transmission line 180 or 185.

Unlike the configuration of the optical one plus one protection switching, the configuration of the optical one-to-one protection switching requires communications of control signals between nodes. The optical one-to-one protection switching configuration is characterized by the inclusion of extra traffic. However, because the optical switch changes the corresponding transmission lines in the configuration, the following problem (A) arises. Problem (A): If any extra traffic is included in a transmission line, when the switching block uses only optical switches as shown in FIG. 12A, the configuration might experience a miss-connection between client terminals in the switching process.

FIG. 12B shows a miss-connection between client terminals in the switching process after a switching request is issued. In FIG. 12B, the miss-connection occurs during a switching operation when a fault is detected in the first transmission line 180 in the down-stream communications. Still also referring to FIG. 12A, in the normal state, the transmitter 200a of the client terminal 200 and the receiver 210b of the client terminal 210 are connected to each other through the first down-stream transmission line 180. The transmitter 205a of the client terminal 205 and the receiver 215b of the client terminal 215 are connected to each other through the down-stream second transmission line 190.

In the case of a fault/maintenance, the optical switches 145 and 155 are switched in the transmit node 120. During this switching in the transmit node 120, their connection states are changed, and a miss-connection might arise. Concretely, the transmitter 200a of the client terminal 200 and the receiver 215b of the client terminal 215 are connected to each other through the down-stream transmission line 190 as partially indicated by dotted-lines. The transmitter 205a of the client terminal 205 and the receiver 210b of the client terminal 210 are connected to each other through the first down-stream transmission line 180 as partially indicated by dotted-lines. After the switching is ended, the connection is normalized after both transmit node 120 and receive node 130 are changed over.

SUMMARY OF THE INVENTION

Under the circumstances, the present invention aims at providing an optical one-to-one protection switching apparatus that prevents the miss-connection between a transmitter and a receiver in the switching process in response to a switching request while a working line is changed to a protection line due to a fault, maintenance, or the like.

According to the solving means of the present invention, a plurality of client terminals is connected to each other in an optical one-to-one switching protection apparatus for enabling optical signals to be exchanged among nodes through the first down-stream and up-stream transmission lines and the second down-stream and up-stream transmission lines. Each of the nodes comprises an optical switch for switching the first and second client terminals to the first or second down-stream transmission line so as to connect them to each other, as well as for switching the first and second client terminals to the first or second up-stream transmission line so as to connect them to each other; up-stream and down-stream gates provided between the second client terminal node and the optical switch; and a controller for controlling the optical switch and the up-stream and down-stream gates. If the second node detects a fault in the first down-stream transmission line while a signal is transmitted through the first down-stream transmission line between the first and second nodes, the controller controls the up-stream and down-stream gates, thereby shutting off or attenuating the object line signal in the second node so as to prevent a miss-connection. The second node transmits a switching request to the first node via the first or second up-stream transmission line. Receiving the switching request, the first node enables the controller to change the optical switch connection so as to connect the first client terminal to the second down-stream transmission line. After that, the first node transmits a switching request to the second node via the second down-stream transmission line. Receiving the switching request, the second node enables the controller to change the optical switch connection so as to connect the first client terminal to the second down-stream transmission line. The present invention provides the optical one-to-one protection switching apparatus.

BRIEF DESCRIPTION OF THE DRAWINGS

Preferred embodiments of the present invention will now be described in conjunction with the accompanying drawings, in which:

FIG. 4 shows the relationship between a line and each line I/O device for switching control communications in the configuration as shown in FIG. 3;

FIG. 5 shows the relationship between a line and each line I/O device for monitoring the performance of the object transmission line in the configuration as shown in FIG. 3;

FIG. 7 shows the relationship between a line and each line I/O device for switching control communications in the configuration as shown in FIG. 6;

FIG. 8 shows the relationship between a line and each line I/O device for monitoring the performance of the object transmission line in the configuration as shown in FIG.6;

FIG. 10 shows the relationship between a line and each line I/O device for monitoring the performance of the object transmission line in the configuration as shown in FIG. 7;

FIG. 12A is a block diagram illustrating an optical one-to-one protection switching apparatus of a related art;

FIG. 12B is a block diagram illustrating the optical one-to-one protection switching apparatus after switching in a fault condition; and FIG. 13 shows a miss-connection between client terminals in the switching process in response to a switching request.

DESCRIPTION OF THE PREFERRED EMBODIMENTS

Figure 1:
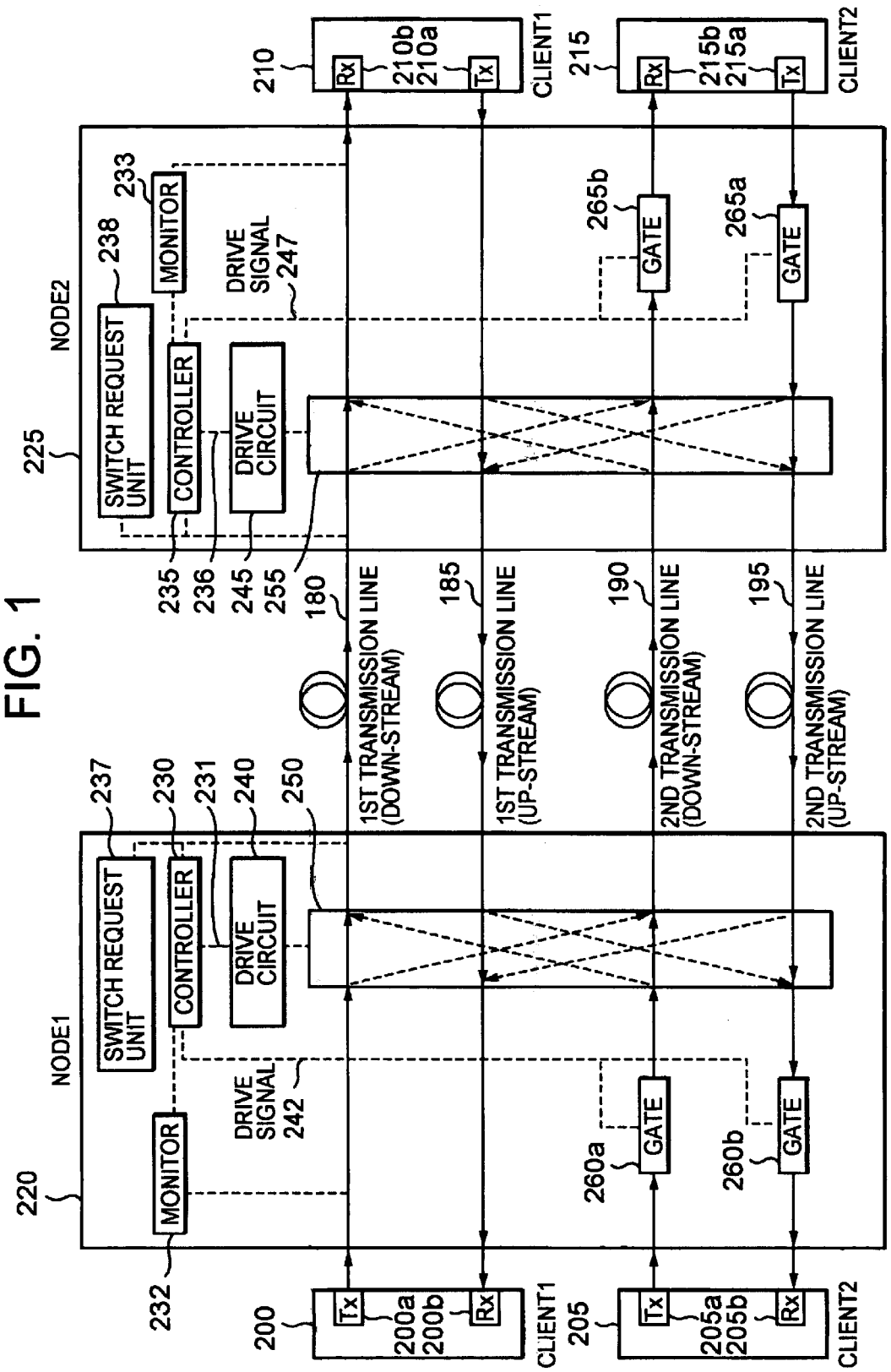
FIG. 1 is a block diagram illustrating the optical one-to-one protection switching apparatus in an embodiment of the present invention.

FIG. 1 shows a block diagram illustrating a first embodiment of the optical one-to-one protection switching apparatus according to the present invention. In the first embodiment, in addition to the components shown in FIG. 12, the nodes 220 and 225 in the apparatus is respectively provided with controllers 230, 235; drive circuits 240, 245, and pairs of gates 260a, 260b and 265a, 265b. In the node 220, the controller 230 controls the drive circuit 240. The drive circuit 240 drives the gates 260a and 260b under the control of the controller 230. The gates 260a and 260b driven by the drive circuit 240 turn on or off a signal. The similar operations are also performed in the node 225 by a corresponding set of the components 235, 245, 265a and 265b.

In this embodiment, gates 260a, 260b, 265a, and 265b are provided on transmission lines so as to solve the above described problem (A), and signals to and from the client terminals 205 and 215 are shut off as needed so as to prevent a miss-connection.

In the first embodiment, it is assumed that clients 1 carries high priority data while clients 2 exchange low priority data.

Figure 2:
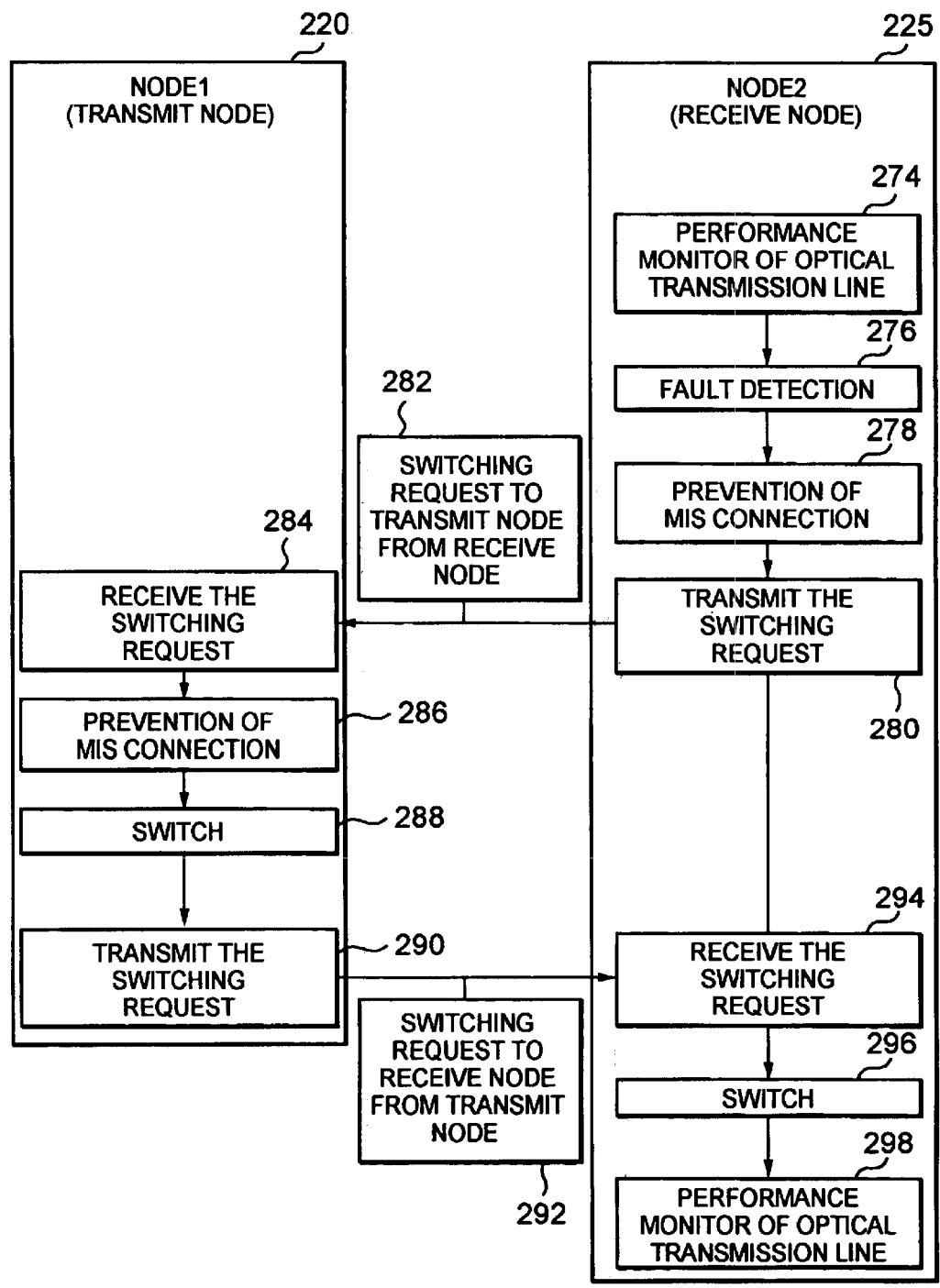
FIG. 2 is a flow chart illustrating a switching sequence for preventing a miss-connection during a transmission line switch.

FIG. 2 shows a flow chart illustrating steps involved in a switching sequence for preventing a miss-connection during a transmission line switch according to the current invention. In this case, a description is provided for a switching procedure in shutting off a gate when a fault occurs in the first transmission line 180 during down-stream communications. However, the switching is also performed in another transmission line, such as the up-stream transmission line, the second transmission line, or the like during a switching operation required due to maintenance, etc. other than a fault. The process is described with respect to steps performed by components as shown in FIG. 1.

At first, signals are exchanged between the transmit node 220 and the receive node 225. The receive node 225 monitors the performance of the first transmission line or down-stream 180 through a performance monitor 232 and 233 in Act 274. At this time, if a fault is detected in the first transmission line 180 in Act 276, a miss-connection preventive processing is executed in Act 278. In the above described processing, the controller 235 controls the drive circuit 245 in the node 225 so as to open the optical gates 265b to block the transmission of optical signals to the receiver 215b. Then, a switching request controller or unit 237 and 238 of the receive node 225 transmits a switching request 282 to the transmit node 220 in Act 280. The switching request 282 transmitted to the transmit node 220 from the receive node 225 is transmitted through the first transmission line or up-stream 185 or the second transmission line or up-stream 195.

On the other hand, the transmit node 220, upon receiving a switching request in Act 284, executes a miss-connection preventive processing in Act 286. In Act 286, the controller 230 controls the drive circuit 240 in the transmit node 220 so as to open the optical gates 260a to block the transmission of optical signals from the transmitter 205a. After that, the switch setting of the optical switch 250 is changed in Act 288, thereby the transmitter 200a of the client terminal 200 is connected to the second transmission line or down-stream 190. At this time, the receiver 200b is connected to the second transmission line or up-stream 195 in the client terminal 200, and the receiver 205b is connected to the first transmission line or up-stream 185. The transmitter 205a is connected to the first transmission line or down-stream 180 respectively in the client terminal 205.

A switching request controller of the transmit node 220 sends a switching request 292 to the receive node 225 in Act 290. The switching request 292 is sent from the transmit node 220 to the receive node 225 via the second transmission line or down-stream 190. When the receive node 225 receives the switching request 292 in Act 294, the switching setting of the optical switch 255 is changed in Act 296. Thereby, the receiver 210b of the client terminal 210 is connected to the second transmission line 190. At this time, the transmitter 210a in the client terminal 210 is connected to the second transmission line 195, and the receiver 215b is shut off by the gate 265b in the client terminal 215. Thereby, the transmitter 215a is connected to the first transmission line (up-stream) 185. In the node 225, a performance monitor 23 monitors the performance of the second transmission line (down-stream) 190 in Act 298. The gates 260b and 265a are also simultaneously as the gates 260a and 265b open in the miss connection preventive processings in Acts 278 and 286. When the gates 260b and 265a are subsequently open after the gates 260a and 265b, the above described process is repeated for transmitters and receivers associated with the transmission lines 185 and 195.

Figure 3:
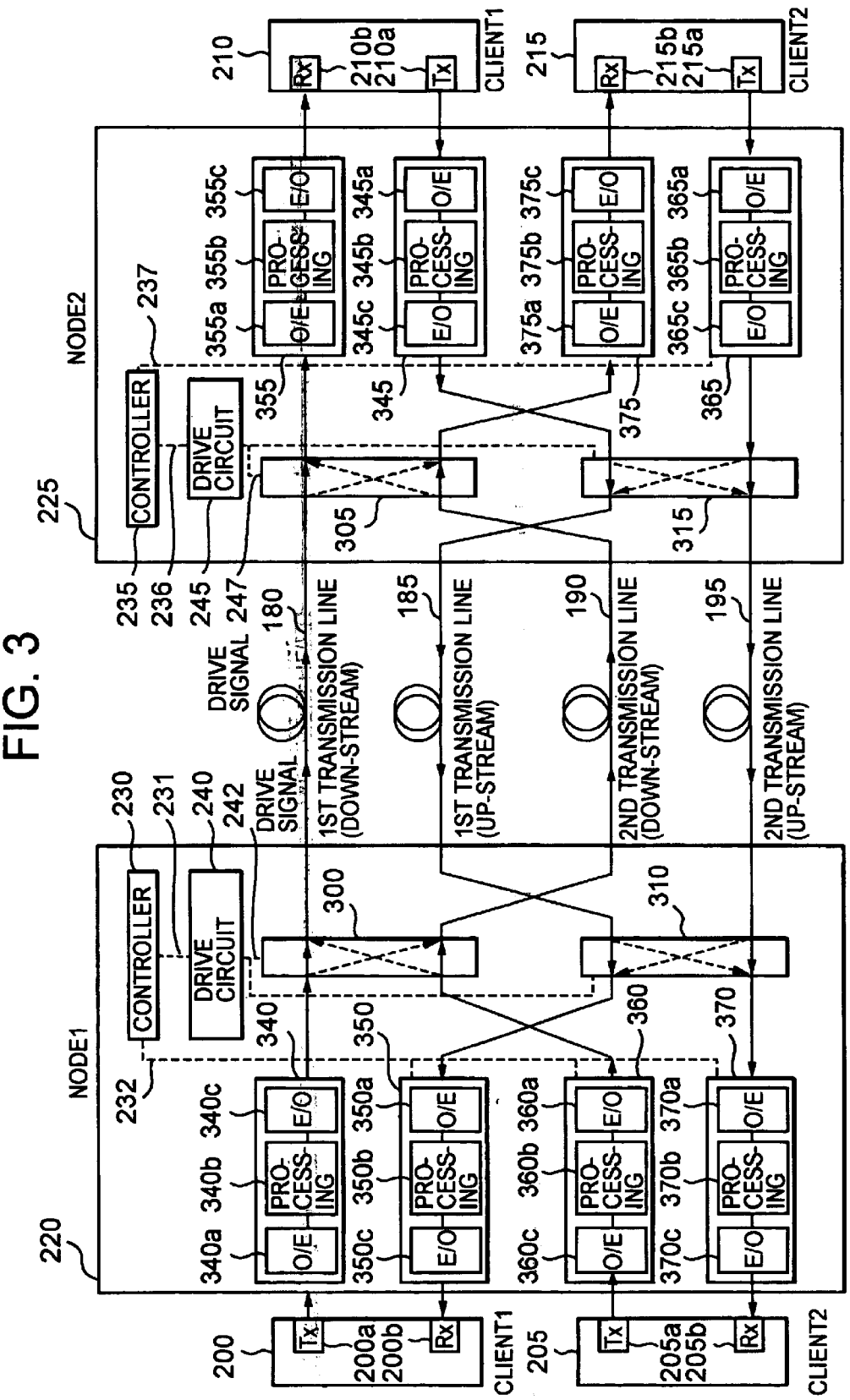
FIG. 3 is a block diagram illustrating the optical one-to-one protection switching apparatus provided with a line input device and a line output device in another embodiment of the present invention.

FIG. 3 shows a block diagram of the optical one-to-one protection switching apparatus provided with a line input device and a line output device in a second embodiment of the present invention. In this embodiment, in addition to the components shown in FIG. 12, each of the node 220 and the node 225 is respectively provided with a controller 230, 235 and a drive circuit 240, 245, line input devices 340, 345, 360 and 365 as well as line output devices 350, 355 and 370, 375. The optical switches 300, 310, 305, and 315 are provided physically closer to transmission lines than those line input/output devices.

Each of the line input devices 340, 345, 360, and 365 is provided with an O/E converter 340a, 345a, 360a, 365a for converting optical signals from the client terminals 200, 210 and the client terminals 205 and 215 to electric signals; processors 340b, 345b, 360b, 365b for performance monitoring, sending/receiving of control signals, and multiplexing of data signals; and electronic-to-optical (E/O) converters 340c, 345c, 360c, 365c for converting electric signals to optical signals appropriate to the object transmission line. These line input devices thus enter the signals to their object transmission lines. At this time, the signal speed, the transmission rate, and the signal format may differ between the client terminal and the transmission line. However, the transmission rate and the signal format are unified between the transmission lines.

Each of the line output devices 350, 355, 370, and 375 is respectively provided with optical-to-electronic (O/E) converters 350a, 355a, 370a, 375a for converting optical signals from transmission lines; processors 350b, 355b, 370b, 375b for performance monitoring, sending/receiving of control signals, and demultiplexing of data signals; and E/O converters 350c, 355c, 370c, 375c for converting electric signals to optical signals. These line output devices thus output signals to object client terminals.

In the embodiment as shown in FIG. 3, the above described gate function as shown in FIG. 1 is implemented by use of the line input devices 340, 345, 360, and 365, as well as the line output devices 350, 355, 370, and 375 so as to solve the above described problem (A). Shutting off a signal is performed by the following two exemplary methods.

(1) The E/O converters 360c, 365c, 370c, 375c stop the output of optical signals therefore.
(2) The processors 360b, 365b, 370b, 375b shut off transmission signals in which a control signal such as an AIS (Alarm Indication Signal) is respectively inserted.

At this time, the line output device 375 monitors the performance of each input signal even when the signal is shut off.

In the above described related art of the optical one-to-one protection switching apparatus that includes only optical switches, miss-connections occur during a line change-over. To avoid the miss-connection, therefore, each of the processors 360b, 365b, 370b, and 375b in this embodiment is provided with a line input device 360, 365 and a line output device 370, 375, thereby shutting off transmit signals or attenuate those signals enough so as to prevent the miss-connection. Although two 2-input-2-output optical switches are used for each node in this embodiment, it is also possible to use only one 4-input-4-output optical switch as shown in FIG. 1.

Although the starting point and the terminating point of a switching control signal differ during switching in the related art, the correspondence table is stored in the controllers 230, 235 or in another memory in advance for communications between the nodes.

In the configuration of the switching block in this embodiment expanded from the optical one plus one switching apparatus by a splitter at the transmitter, miss-connections as described in the following problems (B) and (C) might occur during and after switching. Problem (B): If the optical switch is located closer to the object line than both starting and terminating points of a switching control communication, the correspondence between the transmitter and the receiver is changed with respect to the communication signal in the switching process after a switching request is issued or after the switching of both nodes. Problem (C): If the optical switch is positioned closer to the object line than the performance monitoring point, the correspondence between the signal to be monitored and the receiver for monitoring the signal is changed in the switching process after switching request or after the switching of both nodes.

FIG. 4 shows the correspondence between a line and each of the line input/output devices for switching control communications in the switching configuration as shown in FIG. 3.

In the chart of the switching sequence shown in FIG. 2, the operation of the embodiment as shown in FIG. 3 is considered. The switching request 282 issued from the receive node 225 to the transmit node 220 is given a first priority for transmission to the line output device 370 from the line input device 365 via the second transmission line or up-stream 195. The switching request 282 is given a second priority for transmission to the line output device 360 from the line input device 345 via the first transmission line or up-stream 185. Consequently, if a fault is detected in the first transmission line or down-stream 180, the second transmission line or up-stream 195 that is considered to be normally functioning in comparison to the first transmission line or up-stream 185 can be used. On the other hand, the switching request 292 issued from the transmit node 220 to the receive node 225 is given the first priority for transmission to the line output device 340 from the line input device 375 via the second transmission line or down-stream 190. The switching request 292 is given the second priority for transmission to the line output device 360 from the line input device 355 via the second transmission line or down-stream 180. Also in this case, the line that is considered to be normally functioning is used to transfer the request more surely.

Furthermore, in the second embodiment as shown in FIG. 3, in order to solve the above (B) problem, the correspondence between a transmission line and each of the line input/output devices during switching in each node is stored in a memory provided in the controllers 230 and 235 or in another memory in advance. Thereby, each node sends/receives a control communication signal according to the above correspondence. If the processor of each line input/output device adds or drops a control communication signal in the second embodiment, the correspondence between an object transmission line and the line input/output device during switching in a node is stored in a memory in the controllers 230, 235 in advance, so that each node sends or receives a control communication signal according to the correspondence.

Furthermore, in the second embodiment, in order to solve the above problem (C), the correspondence between an object transmission line and a line input/output during switching of each node is stored in the memory in the controllers 230, 235 or another memory in advance. Thereby each node can monitor the performance of the object transmission line according to the correspondence. In the second embodiment, if the processor of each line input/output device is provided with a function for monitoring the performance of an optical signal, the correspondence between an object transmission line and each line input/output device during switching of a node is stored in the memory provided in the controllers 230, 235 or in another memory in advance, thereby each node can monitor the performance of the object transmission line according to the correspondence.

Concretely, for example, the correspondence between an object transmission line to be monitored and each line input/output device is different from that before and after switching. However, the following correspondence table is stored in the memory in the controllers 230, 235 or in another memory in advance so that each node monitors the performance of the object transmission line.

FIG. 5 shows the correspondence between an object transmission line to be monitored and a line input/output device in the configuration of the switching apparatus shown in FIG. 3. In the normal state before switching, the line input device 340 sends a signal via the first transmission line down-stream 180, and the line output device 355 decides the characteristics of the received signal. In the same way, the line input device 345 sends a signal via the first transmission line (up-stream) 185, and the line output device 350 decides the characteristics of the received signal. The line input device 360 sends a signal via the second transmission line (down-stream) 190, and the line output device 375 decides the characteristics of the received signal. The line input device 365 sends a signal via the second transmission line (up-stream) 195, and the line output device 370 decides the characteristics of the received signal.

On the other hand, the line input device 340 sends a signal via the second transmission line (down-stream) 190, and the line output device 355 decides the characteristics of the received signal. In the same way, the line input device 345 sends a signal via the second transmission line (up-stream) 195, and the line output device 350 decides the characteristics of the received signal. The line input device 360 sends a signal via the first transmission line (down-stream) 180, and the line output device 375 decides the characteristics of the received signal. The line input device 365 sends a signal via the first transmission line (up-stream) 185, and the line output device 370 decides the characteristics of the received signal.

The above signal shuts off the line input devices 360, 365 that have a gate function, as well as a line output device 370, 375 to prevent a miss-connection in the second embodiment. In addition, the correspondence between an object transmission line to be monitored and a line input/output device as shown in FIG. 4 is stored in the controllers 230, 235 in advance for communications between the nodes. In addition, the correspondence between an object transmission line to be monitored and a line input/output device for monitoring the transmission line as shown in FIG. 5 is stored in the controllers 230, 235 in advance so that each node monitors the performance of the object transmission line.

Figure 6:
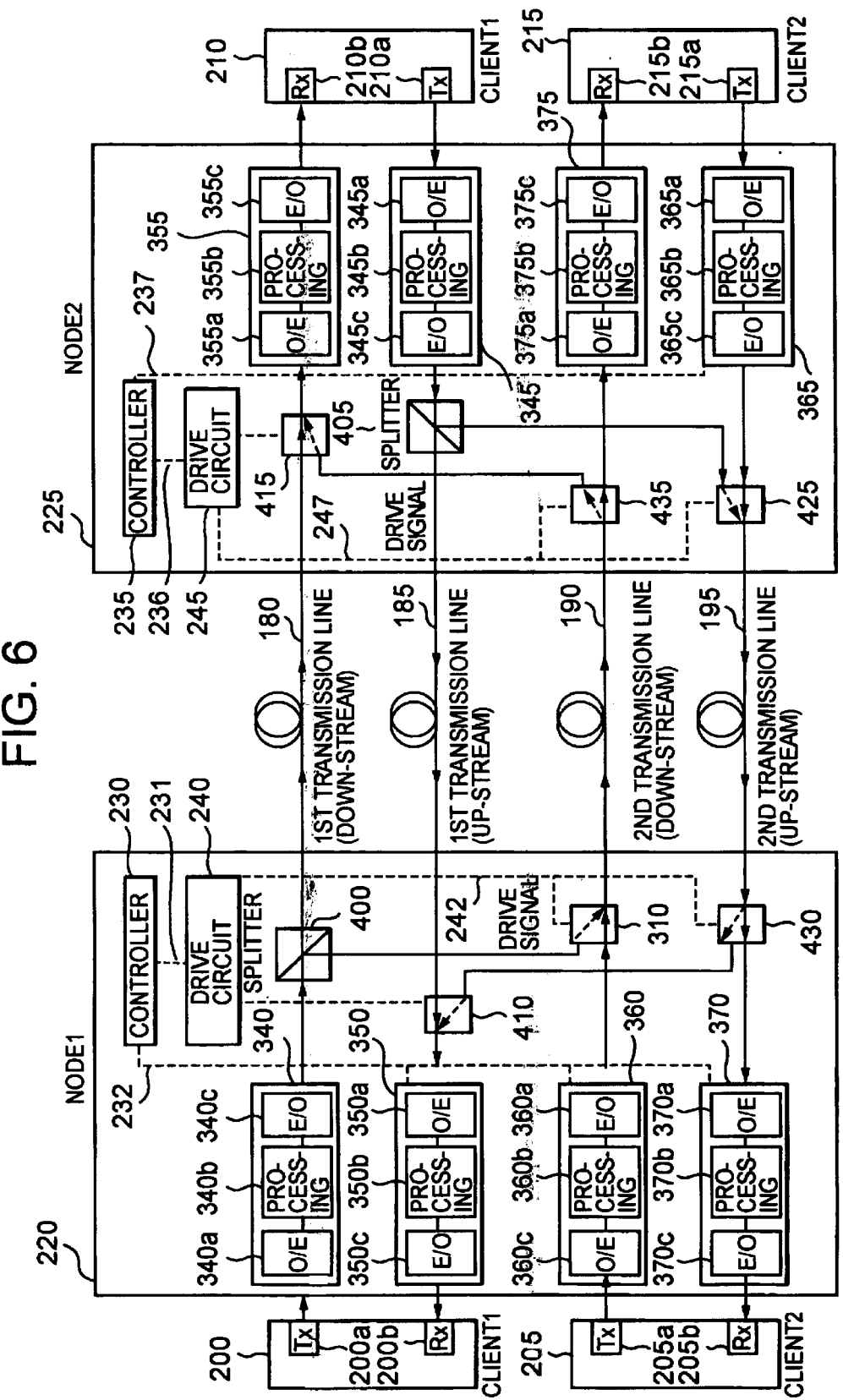
FIG. 6 is a block diagram illustrating the optical one-to-one protection switching apparatus, which is expanded from the optical one plus one protection switching apparatus, in still another embodiment of the present invention.

FIG. 6 shows a block diagram illustrating the optical one-to-one protection switching apparatus in a third embodiment of the present invention. The apparatus is expanded from the optical one plus one switching apparatus. In the third embodiment, the switching block includes splitters 400 and 405 for splitting a signal from the first client terminal so that the optical one plus one protection switching apparatus performs the optical one-to-one protection switching method.

The third embodiment is an optical one-to-one protection switching apparatus expanded from an optical one plus one protection switching apparatus disclosed in a known document with addition of client terminals 205 and 215, as well as second transmission lines 190 and 195. This is why the node 220 is provided with optical switches 410, 420, and 430, and the node 225 is provided with optical switches 415, 425, and 435. Each of the nodes 220 and 225 is further provided with a controller 230 or 235 and a drive circuit 240 or 245. In addition, the input lines to each node are connected to line input devices 340, 345, 360, and 365 and the output lines from each node are provided with line output devices 350, 355, 370, and 375. The splitter 400 of the node 1 splits an optical signal entered from the line input device 340 to the first transmission line 180 and the optical switch 420. The optical one-to-one protection switching apparatus includes the optical switch 420 that selects the signal from the client terminal 2 in the normal state, In the third embodiment, the line output devices 375, 370 are not connected to the first transmission line 180, 185 via the optical switches 430, 435 after switching. Consequently, a client terminal miss-connection might occur only during switching. In the third embodiment of the optical one-to-one protection switching apparatus, a signal is shut off so as to prevent such a miss-connection with, for example, line output devices 370, 375 that have a gate function. In the switching sequence flow chart shown in FIG. 2, the line output device 375 shuts off a signal in the miss-connection preventive process 278 executed in the node 225.

In this optical one plus one protection switching apparatus, the following correspondence between an object line and a line input/output device is stored in the controllers 230, 235 for enabling communications between the nodes.

FIG. 7 shows the correspondence between a line used for switching control communications and a line input/output device in the configuration of the switching apparatus as shown in FIG. 6. In the flow chart of a switching sequence shown in FIG. 2, the switching request signal 282 issued from the receive node 225 to the transmit node 220 is given a first priority for transmission to the line output device 370 from the line input device 365 via the second transmission line (up-stream) 195. The switching request 282 is given a second priority for transmission to the line output device 350 from the line input device 345 via the first transmission line (up-stream) 185. On the other hand, the switching request signal 292 issued from the receive node 225 to the transmit node 220 is given a first priority for transmission to the line output device 375 from the line input device 340 via the second transmission line (down-stream) 190. The switching request signal 292 is given a second priority for transmission to the line output device 355 from the line input device 340 via the first transmission line (down-stream) 180. In the above described manner, if a fault occurs in the first transmission line (down-stream) 180, the second transmission line 190 or 195 that is considered to be in normal operation with higher possibility in comparison to the first transmission line (up-stream) 185, and the second transmission line 190 or 195 is used to transmit the switching request.

Furthermore, in FIG. 7, the following correspondence between an object transmission line to be monitored and a line input/output device for monitoring the transmission line is stored in the controllers 230, 235 so that each node monitors the performance of the transmission line.

FIG. 8 shows the correspondence between an object transmission line to be monitored and a line input/output device for monitoring the transmission line in the switching apparatus as shown in FIG. 6.

The following operation will be described with respect to FIG. 6. In the normal state before switching, the line input device 340 sends a signal via the first transmission line (down-stream) 180, and the line output device 355 decides the characteristics of the received signal. In the same way, the line input device 345 sends a signal via the first transmission line (up-stream) 185, and the line output device 350 decides the characteristics of the received signal. The line input device 360 sends a signal via the second transmission line (down-stream) 190, and the line output device 375 decides the characteristics of the received signal. The line input device 365 sends a signal via the second transmission line (up-stream) 195, and the line output device 370 decides the characteristics of the received signal.

On the other hand, after switching, the line input device 340 sends a signal via the second transmission line (down-stream) 190, and the line output device 355 decides the characteristics of the received signal. In the same way, the line input device 345 sends a signal via the second transmission line (up-stream) 195, and the line output device 350 decides the characteristics of the received signal. The first transmission line (down-stream) 180 and the first transmission line (up-stream) 185 are respectively disconnected from the line output devices by the optical switches 415 and 410.

Figure 9:
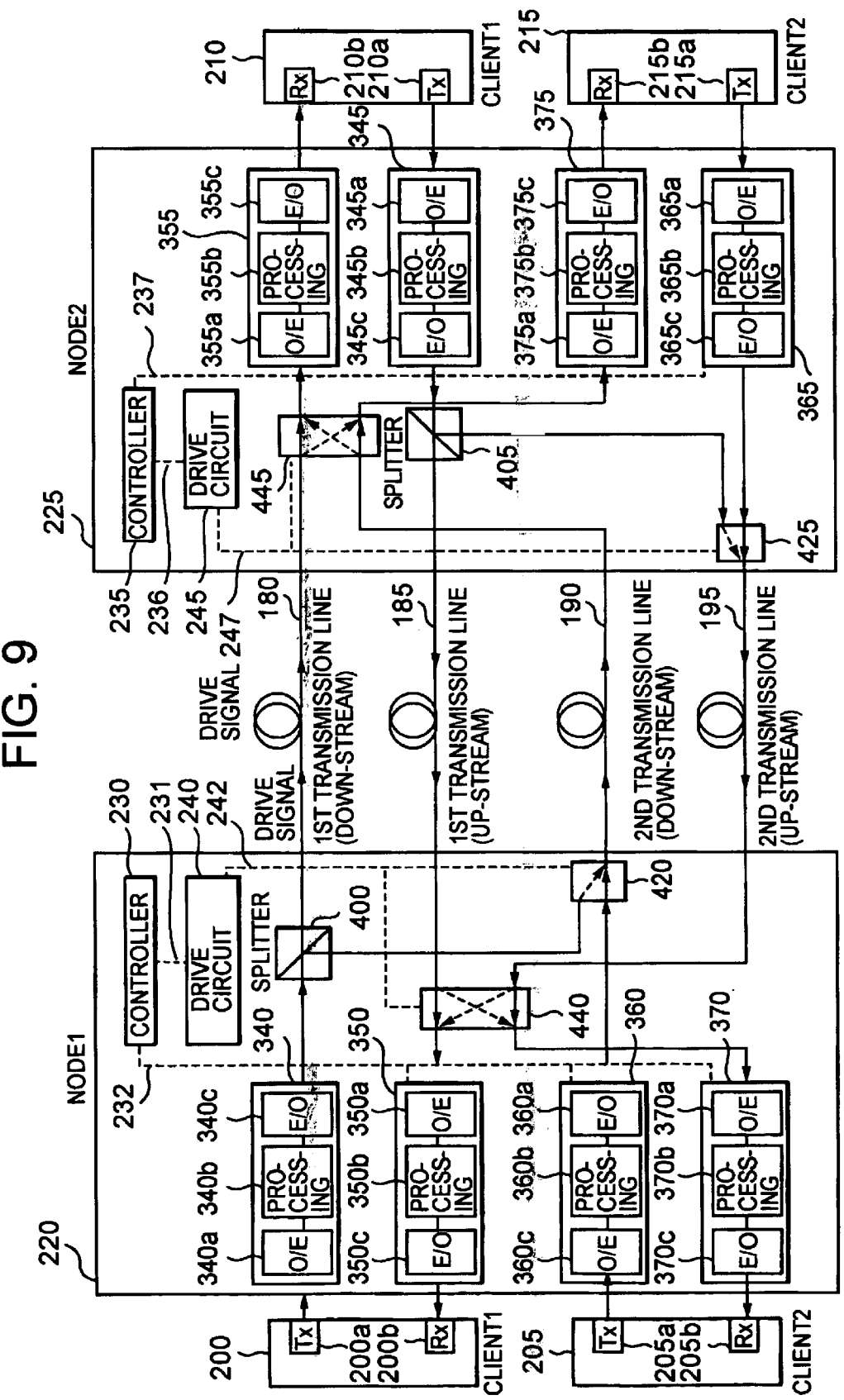
FIG. 9 is a block diagram illustrating the optical one-to-one protection switching apparatus, which is expanded from an optical one plus one protection switching apparatus, in another embodiment of the present invention.

FIG. 9 shows a block diagram illustrating a fourth embodiment of the optical one-to-one protection switching apparatus according to the present invention. The apparatus is expanded from the optical one plus one protection switching method. In this embodiment, the switching block includes splitters 400 and 405 for splitting the signal from the client terminal 200 so that the optical one-to-one protection switching apparatus is expanded from the optical one plus one protection switching apparatus.

In the forth embodiment, in addition to the components of the optical one plus one protection switching apparatus disclosed in a known document, the optical one-to-one protection switching apparatus is further provided with client terminals 205 and 215, as well as the second transmission lines 190 and 195. Consequently, the node 220 is provided with optical switches 440 and 420, and the node 225 is provided with optical switches 445 and 425. Each of the nodes 220 and 225 is provided with controllers 230, 235 and drive circuits 240, 245. In addition, input lines to each node are provided with line input devices 340, 345, 360, and 365, and output lines from each node are respectively provided with line output devices 350, 355, 370, and 375. In the third embodiment as shown in FIG. 6, each node is provided with one 2-input-1-output optical switch and one 1-input-2-output optical switch, but each node in the fourth embodiment is provided with one 2-input-1-output optical switch and one-2-input 2-output optical switch.

In the fourth embodiment, after switching, the line output devices 375 and 370 are connected to the first transmission lines 180 and 185 via the optical switches 445 and 440 so as to monitor the characteristics of the signals in those transmission lines. Consequently, a miss-connection might occur in a client terminal during and after switching.

In this optical one-to-one protection switching apparatus, a signal is shut off by an optical switch 420, 425 and line output devices 370, 375 with a gate function to prevent a miss-connection.

In the switching sequence shown in FIG. 2, the line output device 375 shuts off an object signal in the miss-connection preventive processing 278 executed in the node 225.

Furthermore, in the fourth embodiment of the optical one-to-one protection switching apparatus, as described with reference to FIG. 7, the correspondence between an object line and each line input/output device is stored in the controllers 230, 235 for enabling communications between nodes. Details of the correspondence and the miss-connection preventive processing are the same as those in the third embodiment shown in FIG. 6.

In the configuration in the fourth embodiment of the optical one-to-one protection switching apparatus shown in FIG. 9, the following correspondence between an object transmission line to be monitored and a line input/output device for monitoring the line is stored in the controller 230, 235 so as to enable each node to monitor the performance of the transmission line.

FIG. 10 shows the correspondence between an object transmission line to be monitored and a line input/output device for monitoring the transmission line in the configuration of the switching apparatus as shown in FIG. 9.

In the normal state before switching, the line input device 340 sends a signal via the first transmission line (down-stream) 180, and the line output device 355 decides the characteristics of the received signal. In the same way, the line input device 345 sends a signal via the first transmission line (up-stream) 185, and the line output device 350 decides the characteristics of the received signal. The line input device 360 sends a signal via the second transmission line (down-stream) 190, and the line output device 375 decides the characteristics of the received signal. The line input device 365 sends a signal via the second transmission line (up-stream) 195, and the line output device 370 decides the characteristics of the received signal.

On the other hand, after switching, the line input device 340 sends a signal via the second transmission line (down-stream) 190, and the line output device 355 decides the characteristics of the received signal. In the same way, the line input device 345 sends a signal via the second transmission line (up-stream) 195, and the line output device 350 decides the characteristics of the received signal. The line input device 340 sends a signal via the first transmission line (down-stream) 180, and the line output device 375 decides the characteristics of the received signal. The line input device 345 sends a signal via the first transmission line (up-stream) 185, and the line output device 370 decides the characteristics of the received signal.

Figure 11:
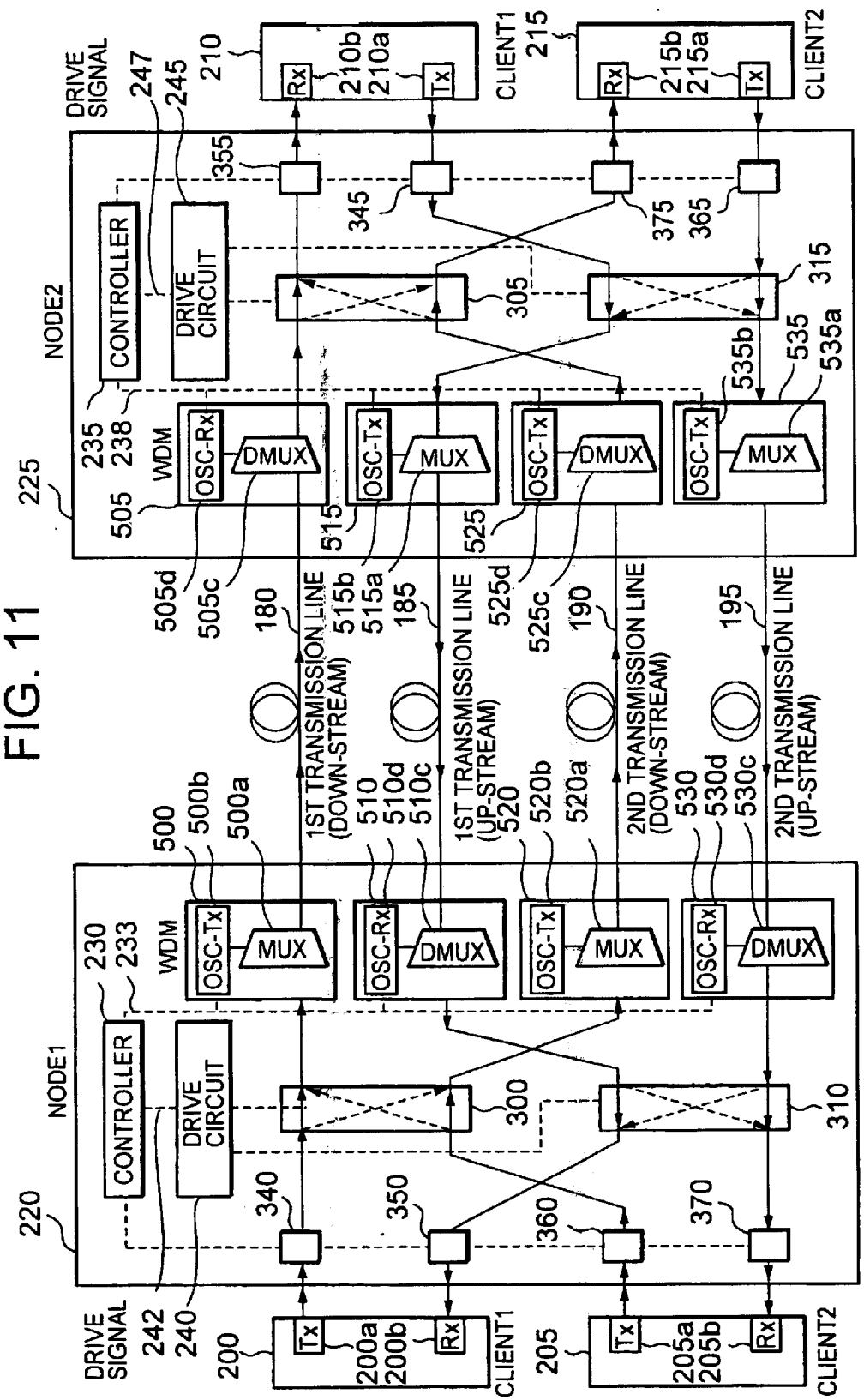
FIG. 11 is a block diagram illustrating the optical one-to-one protection switching apparatus in another embodiment of the present invention.

FIG. 11 shows a block diagram illustrating a fifth embodiment of the optical one-to-one protection switching apparatus according to the present invention. In the fifth embodiment, both starting and terminating points of a control communication signal are positioned closer to the transmission line than the optical switch so as to solve the problem in the above described embodiment. An optical supervised channel of a wavelength division multiplexing (WDM) transmission line is used for switching control communications.

In the fifth embodiment of the optical one-to-one protection switching apparatus, in addition to the components in the configuration shown in FIG. 12, each of the node 220 and the node 225 is provided with a controller 230, 235 and a drive circuit 240, 245. In addition, each transmission line is provided with WDM transmission equipments 500, 505, 510, 515, 520, 525, 530, and 535. Input lines from each node are provided with line input devices 340, 345, 360, and 365 while output lines to each node are provided with line output devices 350, 355, 370, and 375.

Each of the WDM transmission equipments 500, 505, 510, 515, 520, 525, 530, and 535 is provided with multiplexers 500*a*, 515*a*, 520*a*, 535*a*; splitters DMUX 505*c*, 510*c*, 525*c*, 530*c*; optical supervised channel transmitters (Tx)(OSC-Tx) 500*b*, 515*b*, 520*b*, 535*b*; OSC receivers (OSC-Rx) 505*d*, 510*d*, 525*d*, 530*d*.

For example, if the first transmission line (down-stream) 180 is disconnected, the signal break is detected through the performance monitor of the line output device 355, then the E/O 375*c* of the line output device 375 is masked, thereby preventing a miss-connection. After that, the line output device 375 stops its alarm detection and the OSC transmitter 535b of the WDM transmission equipment 535 of the second transmission line (up-stream) 195 outputs a switching request signal via the controller 235. The switching request signal is received by the OSC receiver 530d of the WDM transmission equipment 530 of the node 1 and the E/O of the line input device 360 is masked via the controller 230, thereby changing over the optical switches 300, 310. The controller 230 adds a switching request signal to the monitoring signal from the OSC transmitter 520b. The switching request signal is multiplexed in the signal output from the line input device 340. The multiplexed signal is then output to the second transmission line (down-stream) 190. In response to the switching request signal received by the OSC receiver 525d of the WDM transmission equipment 525, the controller 235 changes the setting of the optical switches 305, 315, thereby terminating the switching process.

In the optical one-to-one protection switching apparatus composed as described above, the controllers 230, 235 have an interface 233, 238 for exchanging information with WDM transmission equipment 500, 505, 510, 515, 520, 525, 530, 535. The controllers 230, 235 enable switching control communications between nodes through an optical supervised channel by the OSC transmitters 500b, 515b, 520b, 535b and the OSC receivers 505d, 510d, 525d, 530d provided in the WDM transmission equipment, thereby keeping the sending/receiving relationship of the switching control communications constant during after switching.

Because both starting and terminating points of a control switching signal in the communication are located closer to the line than the optical switch, the correspondence between the transmitter and the receiver is maintained constant with respect to communication signals. Thereby the switching algorithm is implemented more easily by the controller.

According to the present invention, therefore, it is possible to provide an optical one-to-one switching apparatus that prevents a miss-connection between the transmitter and the receiver in the switching process in response to a switching request for switching from a working line to a protection line due to a fault, maintenance, etc. as described above.

Although the invention has been described in its preferred embodiments with a certain degree of particularity, it is understood that the present disclosure of the preferred embodiments has been changed in the details of construction and the combination and arrangement of parts may be resorted without departing from the spirit and the scope of the invention as hereinafter claimed.

What is claimed is:

1. A method of switching optical transmission lines among terminals, a first terminal and a third terminal being initially communicating via a first optical transmission line, a second terminal and a fourth terminal being initially communicating via a second optical transmission line, a first node being located between the first terminal and the first optical transmission line as well as the second terminal and the second optical transmission line, a second node being located between the third terminal and the first optical transmission line as well as the fourth terminal and the second optical transmission line, comprising the steps of;

detecting a predetermined fault condition on the first optical transmission at the second node;

blocking an output to the fourth terminal from the second node;

transmitting a first switch request from the second node to the first node;

blocking an input from the second terminal to the first node in response to the first switch request;

switching the first terminal to connect to the second optical transmission line from the first optical line transmission after the input is blocked from the second terminal;

transmitting a second switch request from the first node to the second node; and switching the third terminal to connect to the second optical transmission from the first optical transmission in response to the second switch request.

2. The method of switching optical transmission lines according to claim 1 wherein said blocking steps are accomplished by gating of the optical signals.

3. The method of switching optical transmission lines according to claim 1 wherein said blocking steps are accomplished by failing to perform electronic to optical conversion of the optical signals.

4. The method of switching optical transmission lines according to claim 1 wherein said blocking steps are accomplished by processing of electrical signals representing the optical signals.

5. The method of switching optical transmission lines according to claim 1 further comprising:

storing correspondence data on the first terminal, a second terminal a third terminal and a fourth terminal for ascertaining original connections subsequent to said switching steps.

6. A system for switching optical transmission lines among terminals, a first terminal and a second terminal being initially communicating via a first optical transmission line, a third terminal and a fourth terminal being initially communicating via a second optical transmission line, comprising:

a second node being located between the second terminal and the first optical transmission line as well as the fourth terminal and the second optical transmission line, further comprising:

a fault detection unit detecting a predetermined fault condition on the first optical transmission;

a second blocking unit connected to the fourth terminal blocking an output to the fourth terminal from the second node;

a second switch request unit for transmitting a first switch request from the second node to the first node; and a second switch connected to the second terminal, the fourth terminal, the first optical transmission line and the second optical transmission line; and a first node being located between the first terminal and the first optical transmission line as well as the third terminal and the second optical transmission line, further comprising:

a first blocking unit connected to the third terminal for blocking an input from the third terminal to the first node in response to the first switch request;

a first switch connected to the first terminal, the third terminal, the first optical transmission line and the second optical transmission line for switching the first terminal to connect to the second optical transmission line from the first optical transmission line after the input is blocked from the third terminal; and a first switch request unit for transmitting a second switch request from the first node to the second node, wherein said second switch unit switching the second terminal to connect to the second optical transmission line from the first optical transmission line in response to the second switch request.

7. The system for switching optical transmission lines according to claim 6 wherein said first blocking unit and said second blocking unit further comprise an optical gate.

8. The system for switching optical transmission lines according to claim 6 wherein said first blocking unit and said second blocking unit further comprise an electronic-to-optical converter.

9. The system for switching optical transmission lines according to claim 6 wherein said first blocking unit and said second blocking unit further comprise an optical-to-electronic converter for converting an optical signal to an electrical signal and a processing unit connected to said optical-to-electronic converter for processing the electrical signal.

10. The system for switching optical transmission lines according to claim 6 further comprising:
a storage unit connected to said first switch and second switch for storing correspondence data on said first terminal, a second terminal a third terminal and a fourth terminal for ascertaining original connections subsequent to switching.

11. An optical protection switching apparatus, a first terminal being initially connected to another one of the optical protection switching apparatus via a first optical transmission line, a second terminal being initially connected to said another one of the optical protection switching apparatus via a second optical transmission line, comprising:
a switch for switching connections of the first terminal and the second terminal with respect to the first optical transmission line and the second transmission line in response to a switch activation signal;
a switch request unit connected to the first optical transmission line for transmitting to said another one of the optical protection switching apparatus a switch request message indicative of a switch between the first optical transmission line and the second optical transmission line in response to a switch request signal;
a blocking unit connected between the second terminal and said switch for blocking an optical signal between the second terminal and said switch in response to a blocking signal and generating a block completion signal upon completing the block;
a monitor unit connected to the first optical transmission line for detecting a predetermined fault condition in the first optical transmission line and generating a fault condition signal; and
a controller connected to said monitor unit, said switch request unit and said blocking unit for generating the blocking signal in response to the fault condition signal and the switch request signal in response to the block completion signal.

12. The optical protection switching apparatus according to claim 11 wherein said switch is a four-in-four-out optical switch.

13. The optical protection switching apparatus according to claim 11 wherein said switch is a set of two two-in-two-out optical switches.

14. The optical protection switching apparatus according to claim 11 wherein said switch further comprises one one-in-two-out optical switch, two two-in-one-out switch and an optical splitter.

15. The optical protection switching apparatus according to claim 11 wherein said switch further comprises two two-in-two-out optical switches.

16. The optical protection switching apparatus according to claim 11 wherein said line isolator is an optical gate.

17. The optical protection switching apparatus according to claim 11 wherein said line isolator is an electronic-to-optical converter.

18. The optical protection switching apparatus according to claim 11 wherein said line isolator further comprises an optical-to-electronic converter for converting an optical signal to an electrical signal and a processing unit connected to said optical-to-electronic converter for processing the electrical signal.

19. The optical protection switching apparatus according to claim 11 further comprising:
a storage unit connected to said switch for storing correspondence data on the transmitters and the receivers subsequent to switching.

20. An optical protection switching apparatus according to claim 11 wherein said controller generates the switch activation signal upon receiving another one of the switch request message from said another one of the optical protection switching apparatus after said switch request unit has transmitted to said another one of the optical protection switching apparatus an original one of the switch request message.

21. An optical protection switching apparatus, a first terminal being initially connected to another one of the optical protection switching apparatus via a first optical transmission line, a second terminal being initially connected to said another one of the optical protection switching apparatus via a second optical transmission line, comprising:
a switch for switching connections of the first terminal and the second terminal with respect to the first optical transmission line and the second transmission line in response to a switch activation signal;
a switch request unit connected to the first optical transmission line for transmitting to said another one of the optical protection switching apparatus a switch request message indicative of a switch between the first optical transmission line and the second optical transmission line in response to a switch request signal;
a blocking unit connected between the second terminal and said switch for blocking an optical signal between the second terminal and said switch in response to a blocking signal and generating a block completion signal upon completing the block; and
a controller connected to said switch request unit and said blocking unit for generating the blocking signal upon receiving another one of the switch request message from said another one of the optical protection switching apparatus and for further generating the switch request signal in response to the block completion signal.

* * * * *